(12) United States Patent
Shimomura et al.

(10) Patent No.: US 6,809,846 B2
(45) Date of Patent: Oct. 26, 2004

(54) OPTICAL SWITCH AND OPTICAL NETWORK

(75) Inventors: Hirofumi Shimomura, Tokyo (JP); Naoya Henmi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/721,243

(22) Filed: Nov. 26, 2003

(65) Prior Publication Data

US 2004/0114933 A1 Jun. 17, 2004

Related U.S. Application Data

(62) Division of application No. 09/309,768, filed on May 11, 1999.

(30) Foreign Application Priority Data

May 18, 1998 (JP) .......................................... 10-134960

(51) Int. Cl.$^7$ ................................................ G02B 6/12
(52) U.S. Cl. ............................. 359/16; 359/12; 359/13; 359/14; 359/15; 359/26; 359/27
(58) Field of Search ........................ 359/12–16, 26–27, 359/124, 160, 177, 327, 334, 341

(56) References Cited

U.S. PATENT DOCUMENTS

| | | | |
|---|---|---|---|
| 5,521,753 A | 5/1996 | Fake et al. | |
| 5,710,660 A | 1/1998 | Yamamoto et al. | |
| 5,764,821 A | 6/1998 | Glance | |
| 5,812,710 A | 9/1998 | Sugaya | |
| 6,008,932 A | 12/1999 | Luo et al. | |
| 6,038,063 A | 3/2000 | Tsuda et al. | |
| 6,094,296 A | 7/2000 | Kosaka | |
| 6,097,535 A | 8/2000 | Terahara | |
| 6,342,965 B1 | 1/2002 | Kinoshita | |

FOREIGN PATENT DOCUMENTS

| | | |
|---|---|---|
| JP | 3-7917 | 1/1991 |
| JP | 3-49277 | 3/1991 |
| JP | 4-319830 | 11/1992 |
| JP | 5-3356 | 1/1993 |
| JP | 5-130044 | 5/1993 |
| JP | 6-97552 | 4/1994 |
| JP | 6/284092 | 10/1994 |
| JP | 6-311139 | 11/1994 |
| JP | 7-176817 | 7/1995 |
| JP | 8-32554 | 2/1996 |
| JP | 8-65267 | 3/1996 |
| JP | 8-125634 | 5/1996 |
| JP | 8-256112 | 10/1996 |
| JP | 8-288574 | 11/1996 |
| JP | 9-36834 | 2/1997 |
| JP | 9-200157 | 7/1997 |
| JP | 9-214034 | 8/1997 |
| JP | 10-39149 | 2/1998 |

*Primary Examiner*—Mohammad Sikder
(74) *Attorney, Agent, or Firm*—McGinn & Gibb, PLLC

(57) ABSTRACT

Disclosed is an optical switch for transmitting or shutting down an input light signal in accordance with a set switching state. The optical switch comprises first and second optical amplifiers connected in cascade. When an optical fiber amplifier comprising EDFs (11 and 12) and pumping sources (31 and 32) is used as the first and second optical amplifiers, the switching is accomplished by switching on or off the pumping sources (31 and 32) in accordance with control signals supplied from a control circuit (300). One input light signal can be dropped through a first optical branch (51) located on the input side of the optical switch, while another input light signal can be added through a second optical branch (53).

36 Claims, 18 Drawing Sheets

OPTICAL SWITCH AND OPTICAL NETWORK

The present Application is a Divisional Application of U.S. patent application Ser. No. 09/309,768, filed on May 11, 1999.

BACKGROUND OF THE INVENTION

1. Field of the Invention

The present invention relates to an optical switch and an optical network in which the optical switch is used. More particularly, this invention relates to an optical switch having a function in amplifying an input light and an optical network in which the optical switch is used.

2. Description of the Related Art

A photonic switching for performing a path edition with a light intact without converting a light signal into an electric signal in a node can reduce a scale of the node, thus contributing greatly to the reduction of a cost for communication. A switching technique is important in constructing such a node. For example, in an optical ADM (Add/Drop Multiplexing) system, an optical gate switch, by which a signal light is branched or inserted, requires the following properties, i.e., a low crosstalk and a low insertion loss. An EDFA (Erbium-doped Fiber Amplifier) gate switch is exemplified as the switch for satisfying this requirement.

The EDFA gate switch operates as an optical switch by turning on or off a pumping source of EDFA that is an optical fiber amplifier. To switch on the EDFA gate switch, a pumping light is turned on. This permits amplifying and outputting the input light to the EDFA gate switch. On the other hand, to switch off the EDFA gate switch, the pumping light is turned off. This allows the input light to be absorbed into EDF constituting EDFA and thus not to be outputted from EDFA.

With the conventional EDFA gate switch, a single gate switch has fulfilled all of functions as a switch, a controller for an outputted optical power and an optical amplifier. However, a problem exists in that it is difficult for a single gate switch to obtain a high gain and a high power without having an adverse influence on transmission properties.

SUMMARY OF THE INVENTION

An object of the present invention is to realize an optical switch which is capable of obtaining a high gain and a high power.

An optical switch of the present invention comprises first and second optical amplifiers connected in cascade; and a first control circuit for outputting first and second control signals for switching a gain of the first and second optical amplifiers.

Another optical switch according to the present invention is an optical switch for a wavelength-division multiplexed light which is obtained by wavelength-division multiplexing a plurality of light signals. The optical switch comprises an optical wavelength demultiplexer, a plurality of single wavelength optical switches, and an optical wavelength multiplexer.

The optical wavelength demultiplexer demultiplexes the wavelength-division multiplexed light into the plurality of light signals and outputs each of the plurality of light signals to each of a plurality of branches. Each of the single wavelength optical switches is connected to each of the plurality of branches. The optical wavelength multiplexer multiplexes the lights outputted from the plurality of single wavelength optical switches. Each of the plurality of single wavelength optical switches comprises and second optical amplifiers connected in cascade, a first optical coupler connected to an input of the first optical amplifier, and a second optical coupler inserted between the first and second optical amplifiers.

An optical switch according to the third aspect of the present invention is also an optical switch for a wavelength-division multiplexed light which is obtained by wavelength-division multiplexing a plurality of light signals. The optical switch comprises an optical wavelength demultiplexer, a plurality of first optical couplers, a plurality of first optical amplifiers, a plurality of second optical couplers, at least one first optical wavelength multiplexer, and at least one second optical amplifier.

The optical wavelength demultiplexer demultiplexes the wavelength-division multiplexed light into the plurality of light signals and outputs each of the plurality of light signals to each of a plurality of branches. Each of the plurality of first optical couplers is connected to each of the plurality of branches. Each of the plurality of first optical amplifiers has an input connected to an output of each of the plurality of first optical couplers. Each of the plurality of second optical couplers has an input-side first branch connected to the output of each of the plurality of first optical amplifiers. Each input of the first optical wavelength multiplexers is connected to each of output-side branches of some of the plurality of second optical couplers. An input of the second optical amplifier is connected to the output of the at least one first optical wavelength multiplexer.

An optical network of the present invention is an optical network in which a plurality of optical nodes are connected through an optical fiber transmission line, wherein each of the plurality of optical nodes comprises an optical switch of the present invention as described above.

BRIEF DESCRIPTION OF THE DRAWINGS

The above and other objects, features and advantages of the present invention will become more apparent from the following detailed description when taken in conjunction with the accompanying drawings wherein:

FIG. 3 shows what state the optical switch according to the first embodiment of the present invention is in;

DETAILED DESCRIPTION OF THE PREFERRED EMBODIMENTS

The present invention will be described in detail below with reference to the accompanying drawings.

Figure 1:
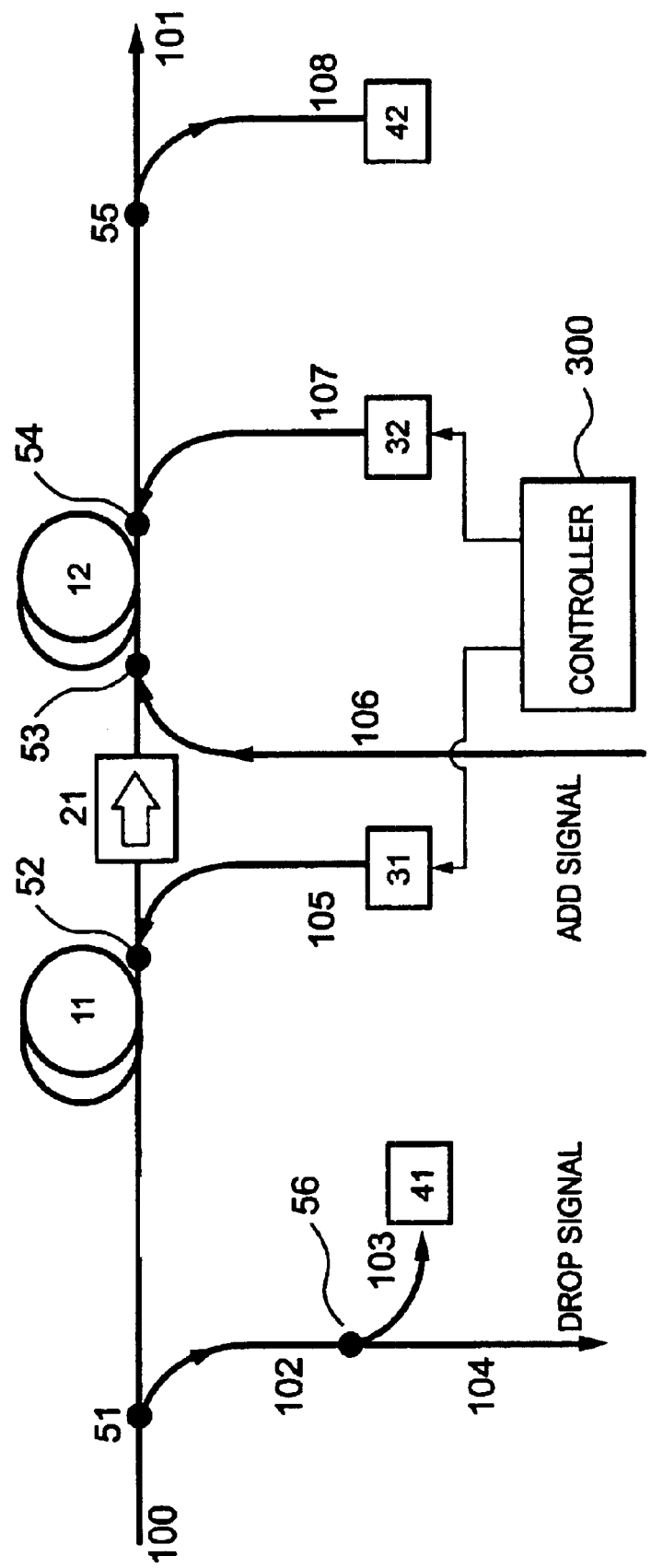
FIG. 1 shows a constitution of an optical switch according to a first embodiment of the present invention.

A first embodiment of the present invention will be described in detail with reference to FIG. 1. FIG. 1 shows a constitution of an optical switch according to the first embodiment of the present invention. The optical switch of FIG. 1 comprises optical branches 51 and 56, EDF 11, a pumping source 31, an optical branch 52, an optical isolator 21, an optical coupler 53, EDF 12, an optical coupler 54, a pumping source 32, an optical branch 55, an optical monitor 42 and a control circuit 300.

A signal light of wavelength 1550 nm is inputted to the optical switch through an optical transmission line 100. The input signal light is first inputted to the EDF 11. On the other hand, a pumping light of wavelength 1480 nm, which is outputted from the pumping source 31 to an optical transmission line 105, is inputted to the EDF 11 through the optical branch 52. The signal light is optically amplified by the EDF 11 and then inputted to the EDF 12 via the optical isolator 21. On the other hand, the pumping light of wavelength 1480 nm, which is outputted from a pumping source 32 to an optical transmission line 107, is inputted to the EDF 12 through the optical branch 54. The signal light is amplified by the EDF 12 and then outputted to an optical transmission line 101. A part of the light outputted from the EDF 12 is separated by the optical branch 55, and its optical power is detected by the optical monitor 42. The output power of the pumping source 32 can be fed back to a set value in accordance with the result of this detection.

The optical branch 51 is installed on the optical transmission line 100, whereby the light inputted to the optical transmission line 100 can be outputted from an optical transmission line 104 through an optical transmission line 102. That is, the light inputted to the optical transmission line 100 can be simultaneously outputted from the optical transmission lines 101 and 104.

Figure 2:
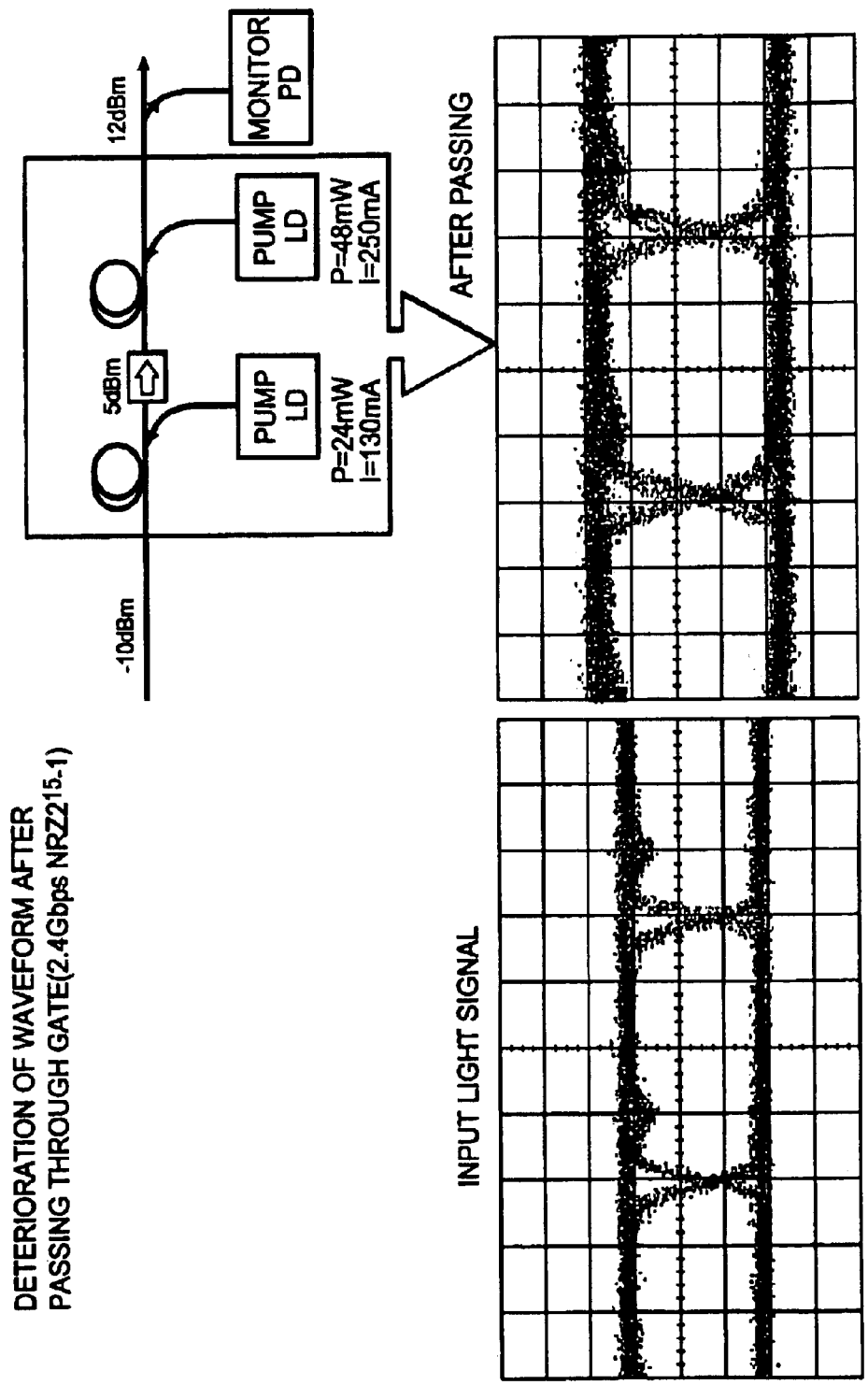
FIG. 2 shows how the first embodiment of the present invention operates.

FIG. 2 shows the result of an experiment which was performed using the optical switch according to the first embodiment. As can be seen in FIG. 2, the output light whose output power is about +12 dBm was obtained for the optical power outputted from the pumping source 31, 24 mW and the optical power outputted from the pumping source 32, 48 mW. It is seen from an input/output waveform of a light signal shown in FIG. 2 that good transmission quality is ensured.

Figure 3:
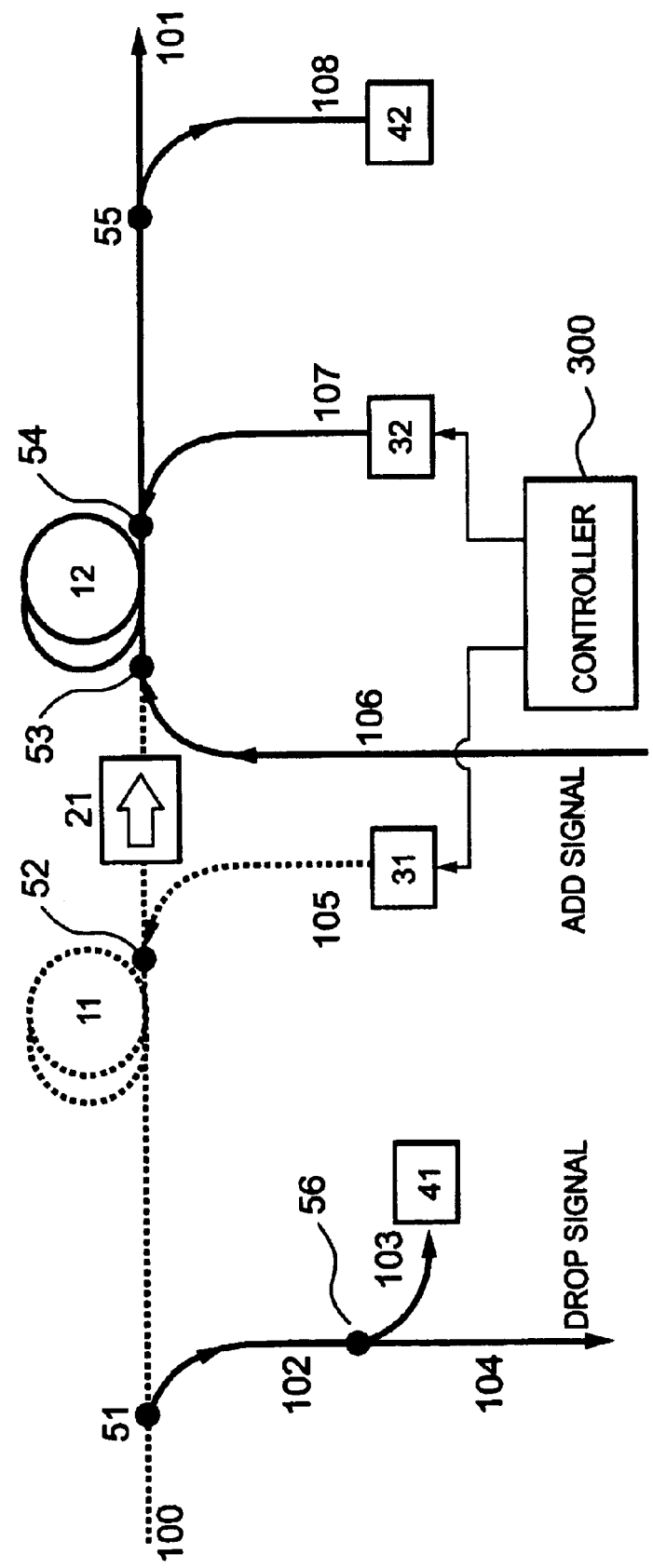

On the other hand, when the injection of the pumping light to the EDF 11 is stopped as shown in FIG. 3, the signal light of wavelength 1550 nm is absorbed by the EDF 11 and thus it is not outputted downstream. The injection of the pumping light is set to off by switching a control signal to be supplied to the pumping source from the control circuit 300. The pumping light is thus turned on or off, whereby an optical gate switch followed by the source is controlled so that it is switched on or off. The present optical switch permits an optical switching with a low crosstalk. Another light signal can be therefore inputted from an optical transmission line 106, when the optical gate switch is switched off. The input signal is inputted to the EDF 12, then amplified by the EDF 12 and then outputted to the optical transmission line 101. With the above constitution, the EDF 11 can switch the inputs from the optical transmission lines 100 and 106, and also the EDF 12 can control a gain. The optical switch, which functions as an optical amplifier as well as the switch, can be therefore implemented without deteriorating the transmission properties. Consequently, the optical switch of this constitution can have two statuses. A first status is a drop-and-continue mode in which the light is inputted from the optical transmission line 100 and outputted from the optical transmission lines 101 and 104. A second status is a drop-and-add mode in which the light is inputted from the optical transmission line 100 and outputted from the optical transmission line 104, and the light of another signal is inputted from the optical transmission line 106 and outputted from the optical transmission line 101. The switching of these two statuses can be accomplished by switching on or off an EDFA gate located at the preceding stage in the optical switch.

Figure 4:
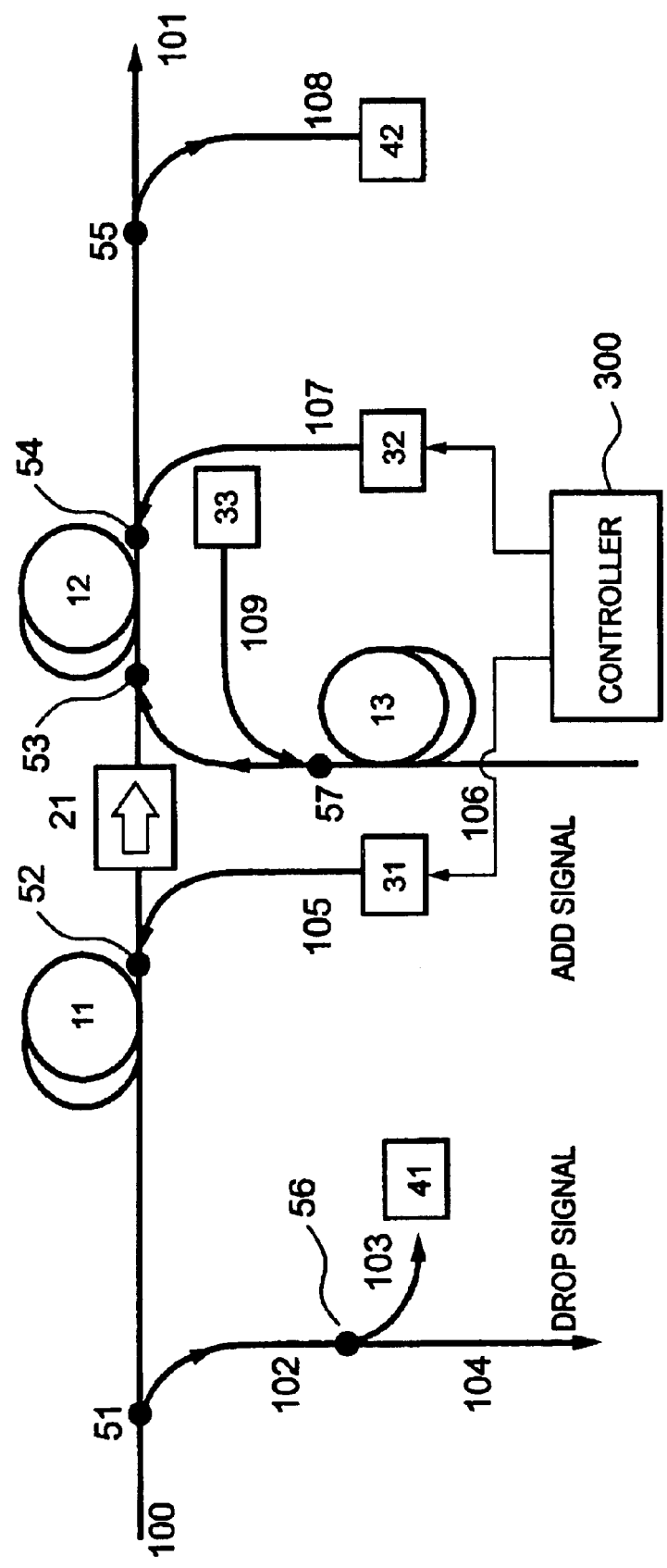
FIG. 4 shows the constitution of an optical switch according to a second embodiment of the present invention.

Next, a second embodiment of the present invention will be described in detail with reference to FIG. 4.

In optical switch described in the first embodiment, a maximum output from the optical switch is limited when the optical power inputted from the optical transmission line 106 is considerably low compared to the power outputted from the EDF 11. Desirably, another optical amplifier is therefore inserted into the optical transmission line 106 so that the input optical power is amplified. The second embodiment shown in FIG. 4 comprises an EDF 13, a pumping source 33, an optical transmission line 109 connecting the pumping source 33 and the optical transmission line 106 and an optical branch 57, in addition to the constitution of the first embodiment of FIG. 1. Thus, even when the optical power of the signal inputted to the optical transmission line 106 is considerably lower than the optical power of the signal outputted from the EDF 11, it is allowed to be substantially equal to the output from the EDF 11 by controlling the gain of the EDF 13. This can be also used to switch the signal lights inputted to the optical transmission lines 106 and 100.

Figure 5:
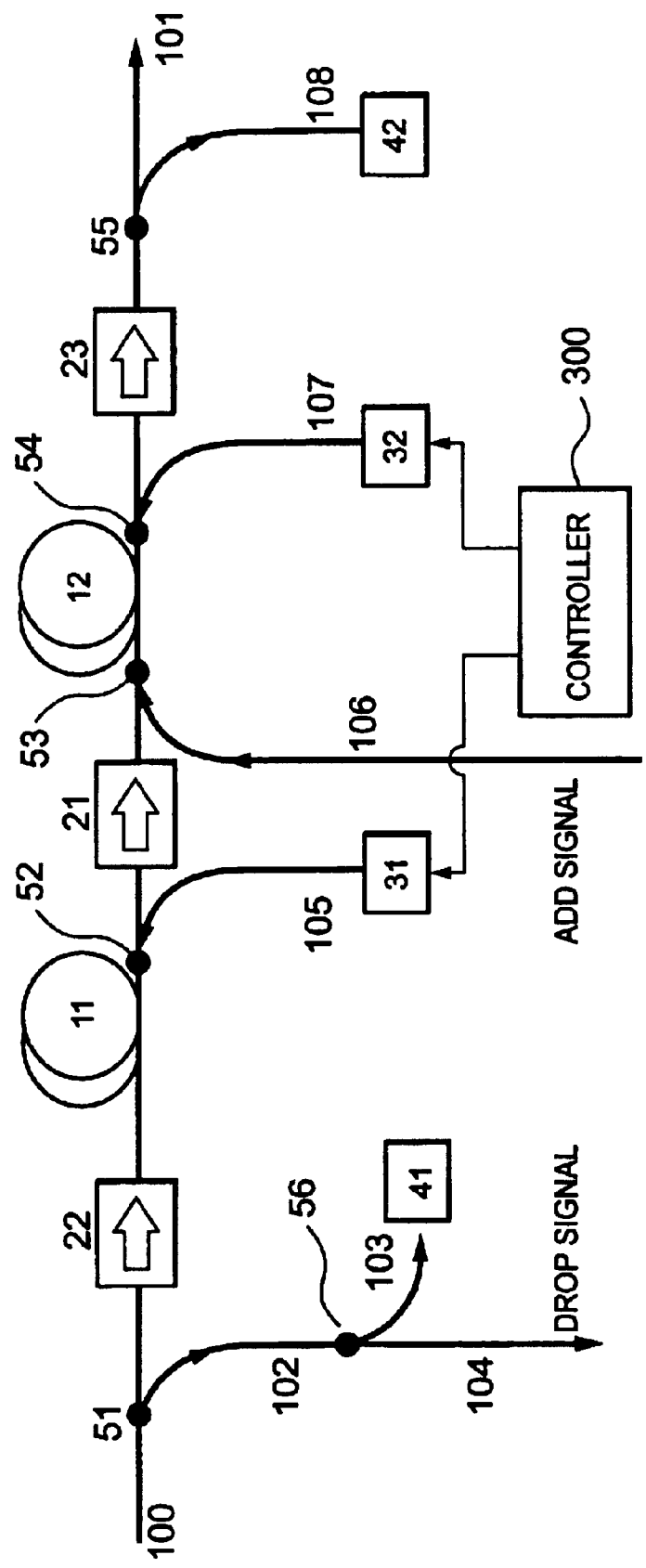
FIG. 5 shows the constitution of an optical switch according to a third embodiment of the present invention.

Next, a third embodiment of the present invention will be described in detail with reference to FIG. 5.

A plurality of pumping sources are used and many optical components and connections are also included in the switch described in the above embodiments. The transmission properties of the optical switch may be thus changed by an influence of an optical reflection in the connections and optical components. Therefore, the third embodiment shown in FIG. 5 comprises an optical isolator 22 inserted between the optical branch 51 and the EDF 11 and an optical isolator 23 inserted between the optical branches 54 and 55, in order to reduce the influence of the reflection as rigidly as possible. This permits reducing the influence of the reflection in the optical switch, thereby improving a noise figure of each optical amplifier.

The number of the optical isolators to be used and the positions in which they are inserted are not limited to this example alone. For example, the optical isolator 23 may be located between the EDF 12 and the optical branch 54. The position of the optical isolator may be appropriately changed as far as it does not affect the function of the optical switch.

Next, a fourth embodiment of the present invention will be described in detail with reference to the drawing.

Figure 6:
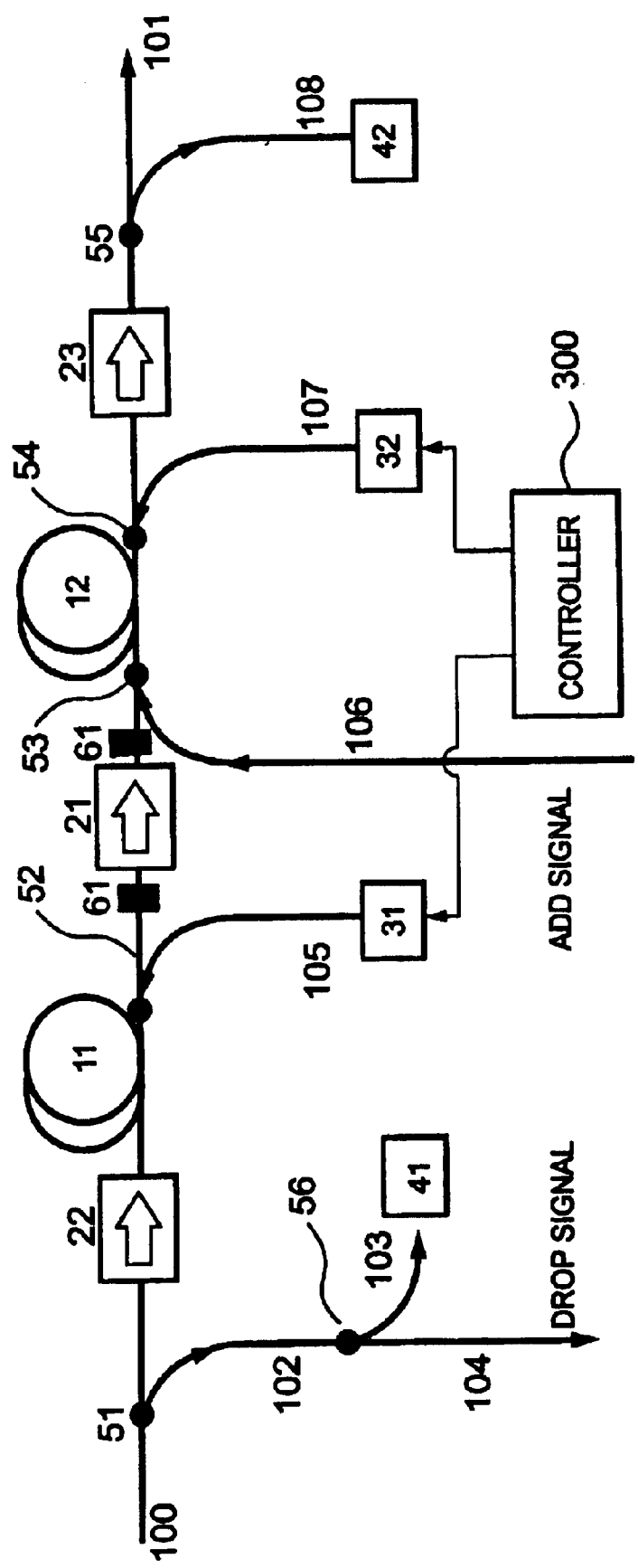
FIG. 6 shows the constitution of an optical switch according to a fourth embodiment of the present invention.

The switch described in the above embodiments is turned on or off by using the principle that the signal light is optically absorbed into EDF. When the switch is turned off, an amplified spontaneous emission pumped by the signal light, but a little emission, is therefore outputted from EDF. The fourth embodiment shown in FIG. 6 comprises an optical filter 61 inserted between the optical isolator 21 and the optical branch 52 in order to limit the influence of the amplified spontaneous emission from the EDF 11 as rigidly as possible. The amplified spontaneous emission, which is generated by turning off the gate switch comprising the preceding optical amplifier, can be thus prevented from traveling to the following stage. The influence of the amplified spontaneous emission can be consequently limited.

The number of the optical filters to be used and the positions in which they are inserted are not limited to this example alone. For example, the optical filter 61 maybe inserted between the optical isolator 21 and the optical branch 53. The position of the optical filter may be appropriately changed as far as it does not affect the function of the optical switch.

Next, a fifth embodiment of the present invention will be described in detail with reference to the drawing.

Figure 7:
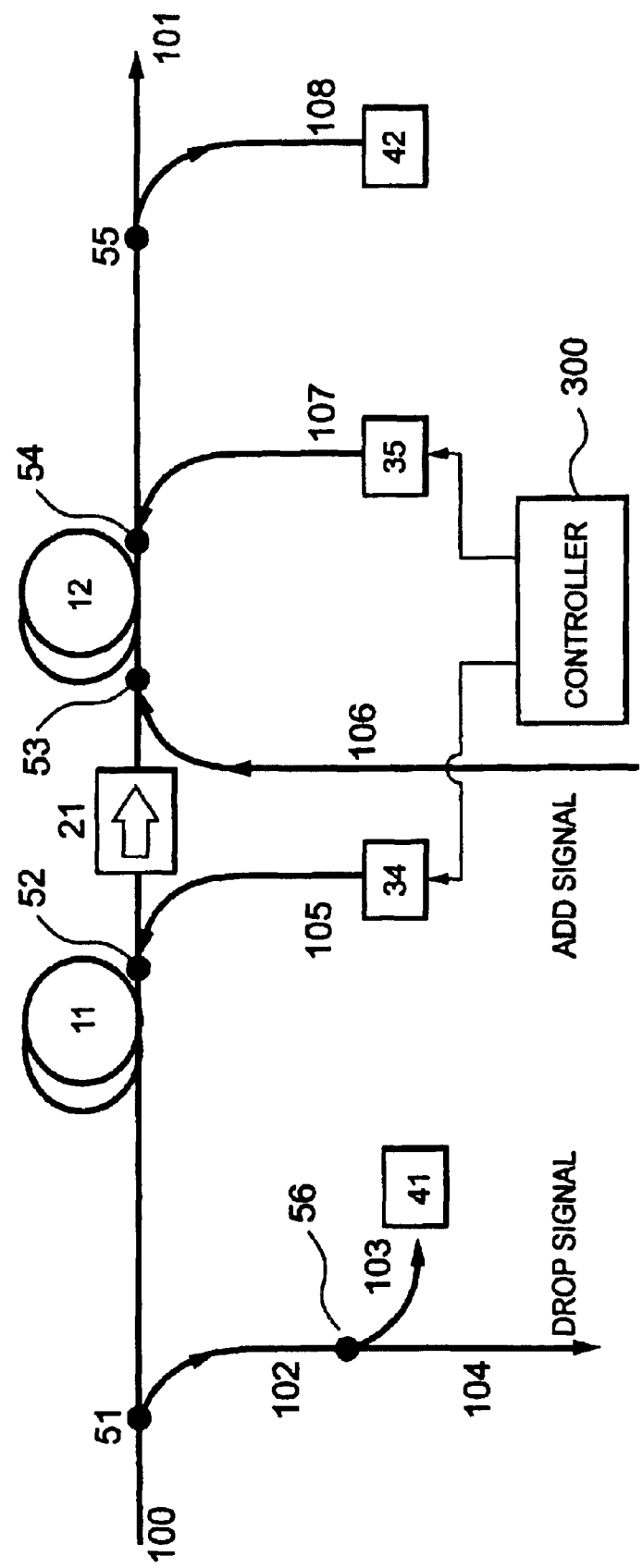
FIG. 7 shows the constitution of an optical switch according to a fifth embodiment of the present invention.

A laser having wavelength of around 1480 nm is used as the pumping source in the switch described in the above embodiments. To multi-stage connect the optical switches using the optical amplifier, the influence of an accumulated noise from the optical gate comprising the optical amplifier cannot be ignored. In the fifth embodiment shown in FIG. 7, the wavelengths of pumping sources 34 and 35 are therefore set to around 980 nm. Thus, the noise figure can be reduced compared to the case where the pumping source of wavelength band 1480 nm is used. Consequently, the transmission properties can be expected to be improved.

The wavelength for use in the pumping source is not limited to 1480 nm or 980 nm alone. Furthermore, for example, of two optical amplifiers, the pumping source of the preceding optical amplifier may have a band of 980 nm, while the pumping source of the following optical amplifier may have a band of 1480 nm. The wavelengths for the pumping sources of the optical amplifiers may be appropriately changed as far as it does not affect the function of the optical switch.

Figure 8:
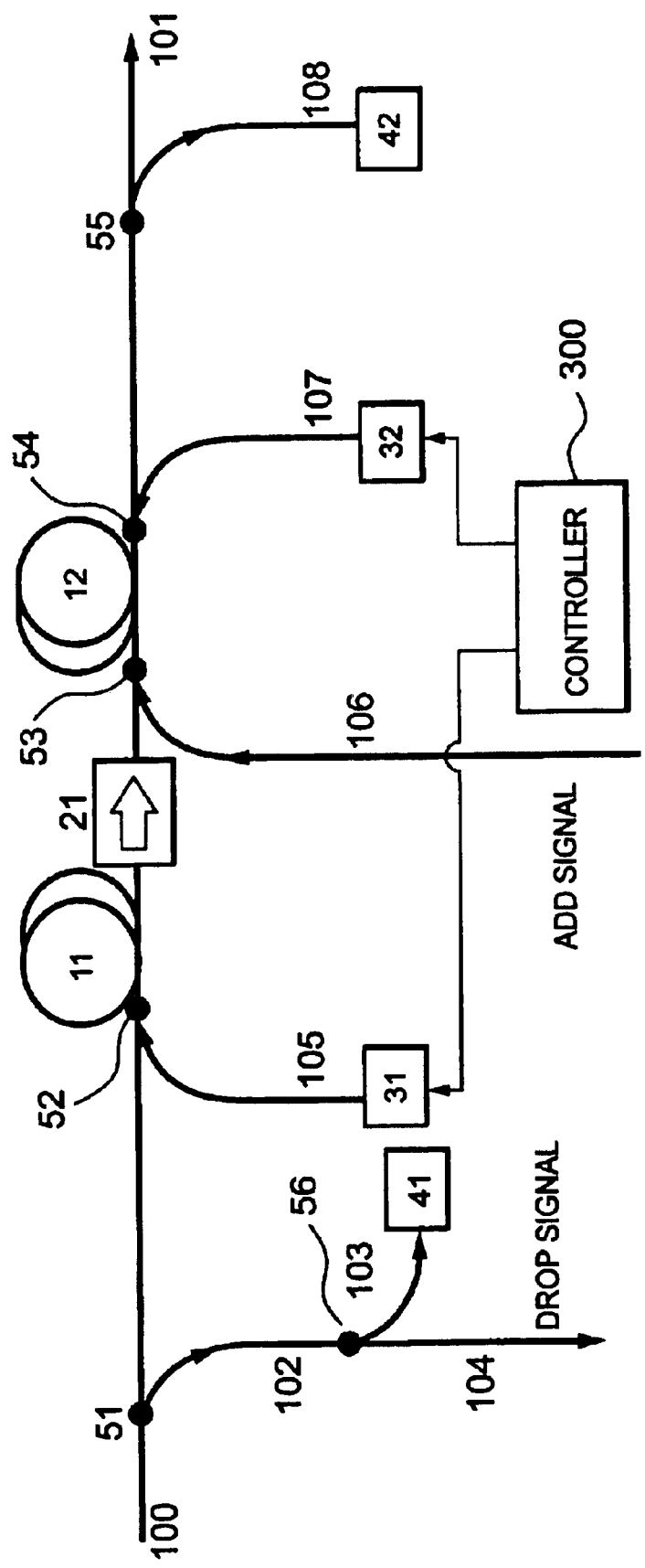
FIG. 8 shows an example of the constitution of an optical switch according to a sixth embodiment of the present invention.

Next, a sixth embodiment of the present invention will be described in detail with reference to the drawings. In the above embodiments, all of the preceding and following optical amplifiers constituting the optical switch are backward-pumped optical amplifiers. EDF constituting the preceding optical amplifier needs to absorb the signal light when it is off. Depending on the wavelength of the signal light, an EDF length must be thus longer than the EDF length which is set when EDF is used as a typical optical amplifier. If long EDF is used, a backward pumping light may not reach the input side of EDF when the gate switch is turned on. When a sufficient power of the pumping light is not supplied to the input side, a loss of the input light signal increases near an input end of EDF. Thus, the noise figure of the optical amplifier increases. Therefore, in the sixth embodiment shown in FIG. 8, the preceding optical amplifier comprises a forward-pumped optical amplifier. This allows the noise figure to be lower than the noise figure of the backward pumping, thereby improving the transmission properties.

Figure 9:
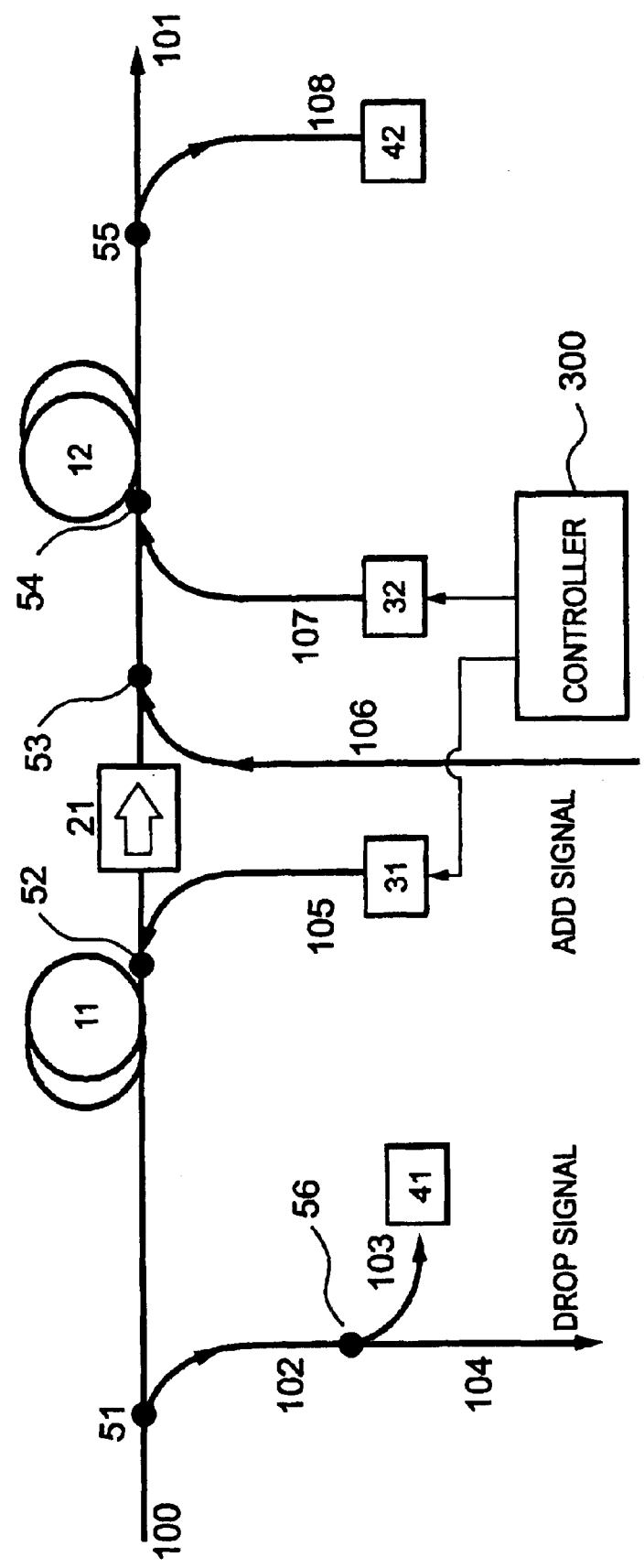
FIG. 9 shows an example of the constitution of the optical switch according to the sixth embodiment of the present invention.
Figure 10:
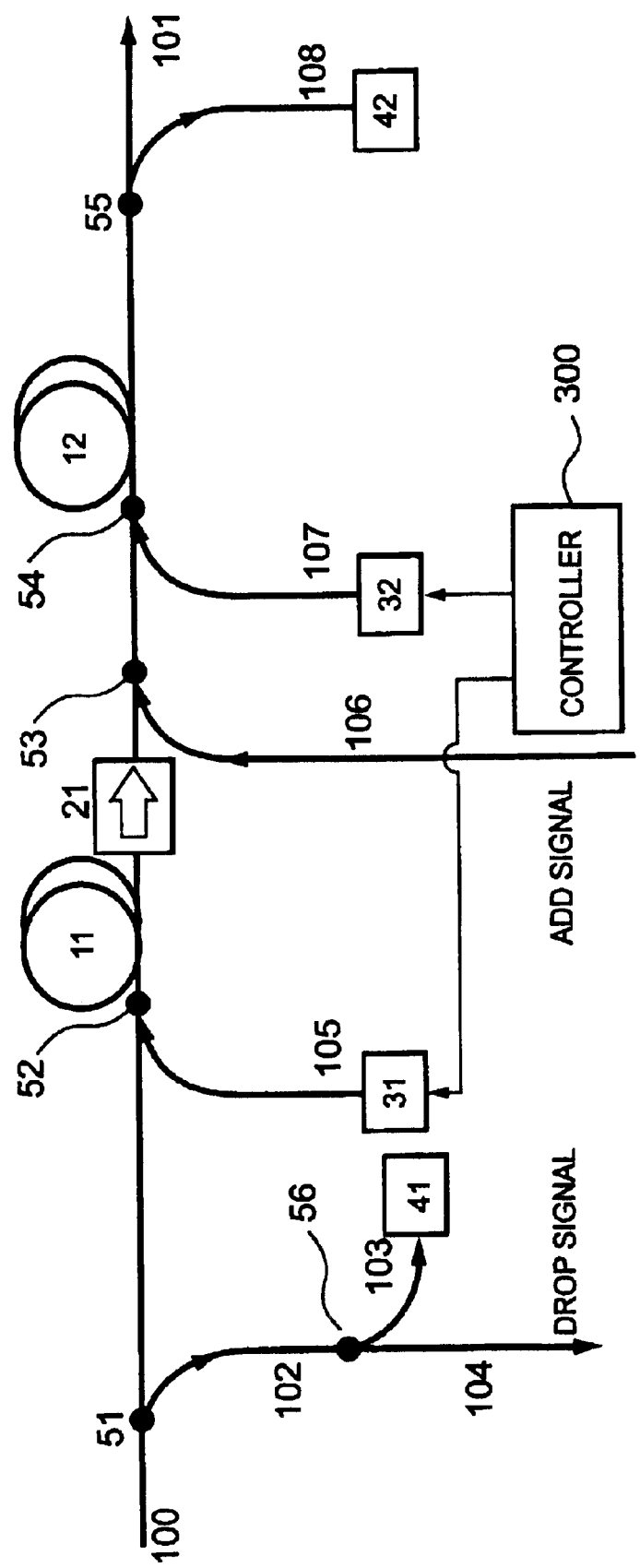
FIG. 10 shows an example of the constitution of the optical switch according to the sixth embodiment of the present invention.

Pumping scheme for the optical amplifier is not limited to the method in which the preceding and following optical amplifiers are forward pumped and backward pumped, respectively. For example, as shown in FIG. 9, the preceding and following optical amplifiers may be backward pumped and forward pumped, respectively. As shown in FIG. 10, both of the preceding and following optical amplifiers may be forward pumped. The pumping method may be appropriately changed as far as it does not affect the function of the optical switch.

Next, a seventh embodiment of the present invention will be described in detail with reference to the drawing.

Figure 11:
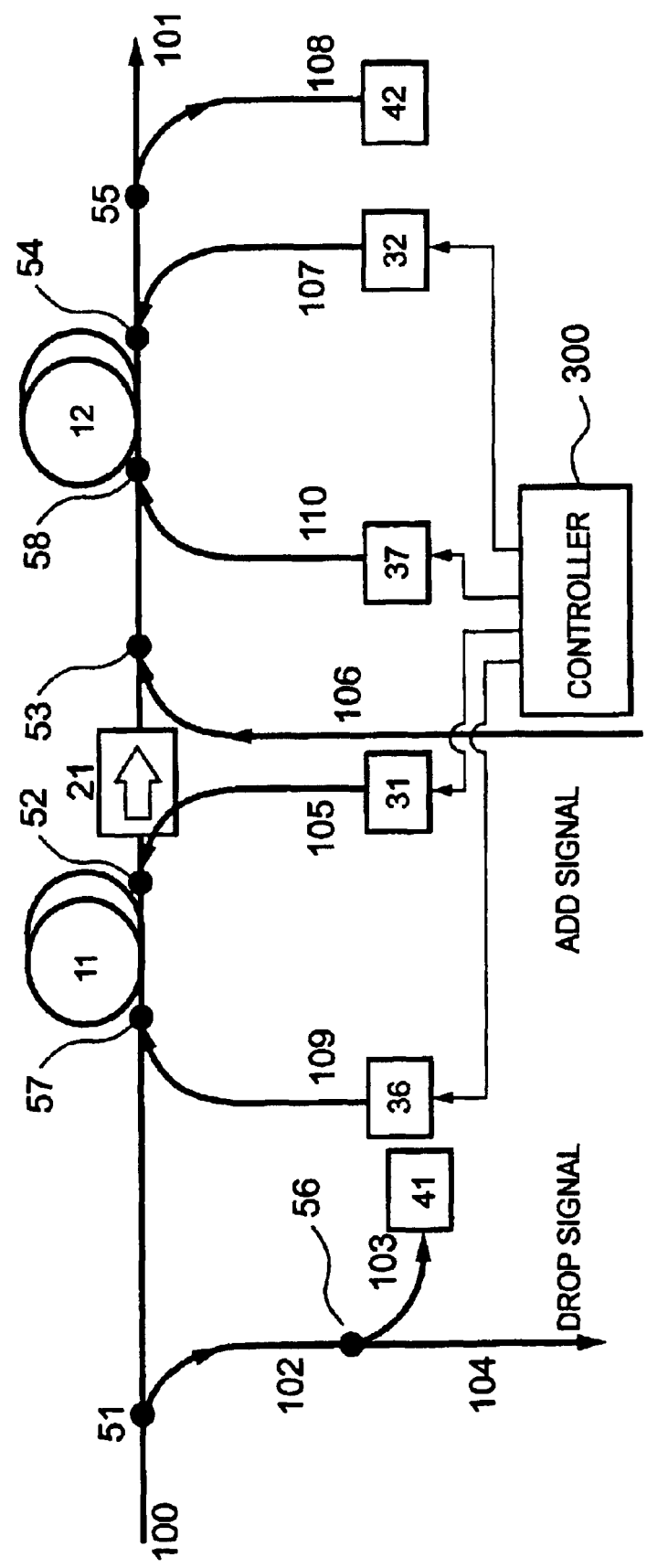
FIG. 11 shows the constitution of an optical switch according to a seventh embodiment of the present invention.

When a need exists to increase the gain and maximum output of the EDFA gate compared to the switch described in the above embodiments, the optical switch is constituted as described below. As shown in FIG. 11, optical branches 57 and 58, optical transmission lines 109 and 110 and pumping sources 36 and 37 are added to the optical switch used in the first embodiment, whereby the EDFA gate is bidirectionally pumped, so that the need can be met. Since the number of pumping sources is increased to 4 in total, a control circuit 301 capable of independently supplying four control signals to the pumping sources is used.

The method of increasing the output optical power is not limited to this method alone. For example, the lights outputted from a plurality of pumping sources may be wavelength-division multiplexed or polarization multiplexed, whereby the output optical power can be increased.

Next, an eighth embodiment of the present invention will be described in detail with reference to the drawing.

Figure 12:
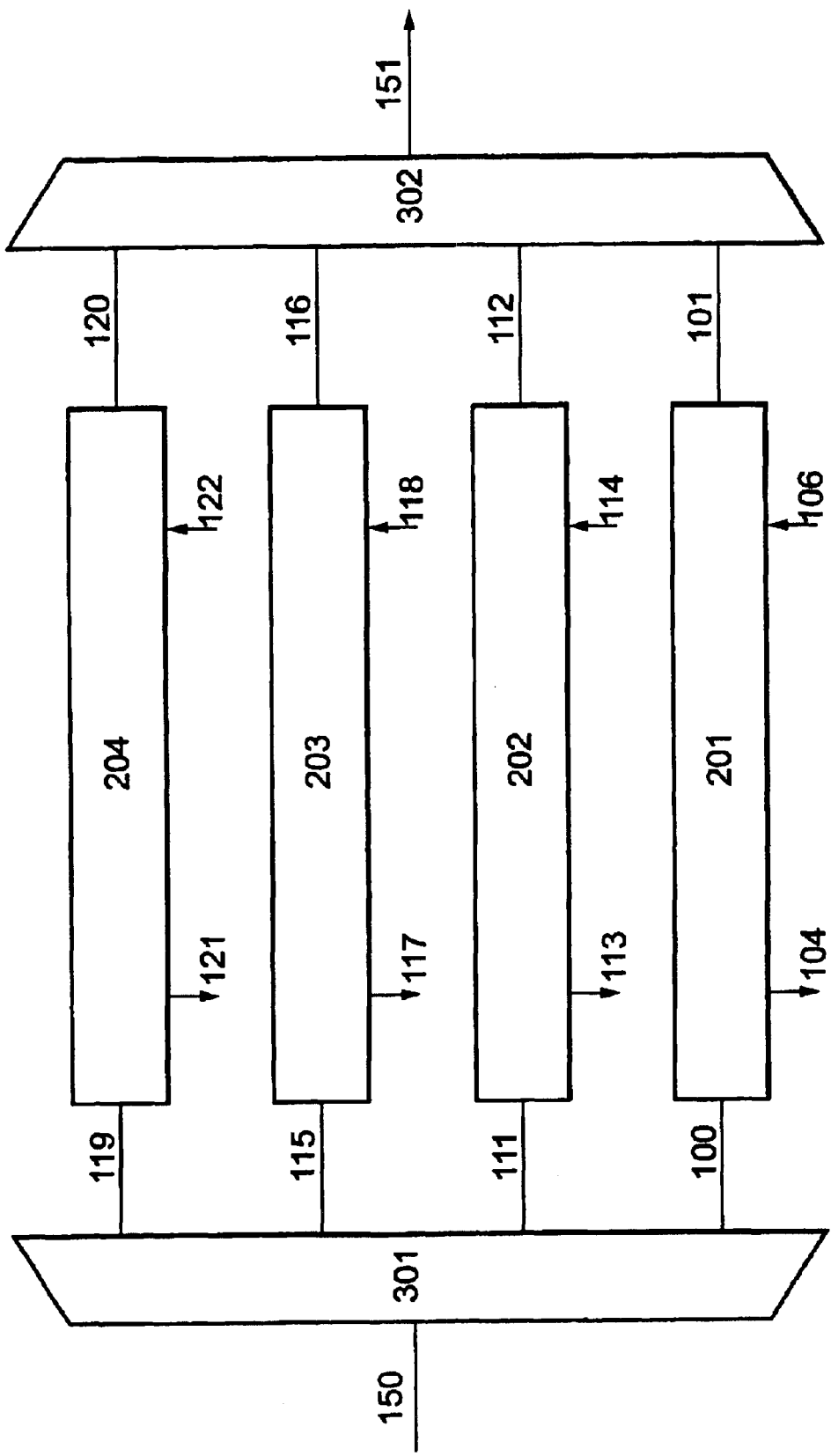
FIG. 12 shows the constitution of an optical ADM according to an eighth embodiment of the present invention.

The constitution of the optical switch according to the eighth embodiment is shown in FIG. 12. The optical switch of FIG. 12 comprises an optical wavelength demultiplexer 301, an optical wavelength multiplexer 302 and single wavelength optical switches 201–204. Any one of the constitutions shown in the above embodiments can be used as the single wavelength optical switch.

The light signal, which is obtained by wavelength-division multiplexing the signal lights of wavelengths 1550 nm, 1552 nm, 1554 nm and 1556 nm, is inputted from an optical transmission line 150 of FIG. 12. The wavelength-division multiplexed light signal is demultiplexed by the optical wavelength demultiplexer 301 and then outputted to the optical transmission lines 100, 111, 115 and 119 for each wavelength. The signal light of wavelength 1550 nm outputted to the optical transmission line 100 is inputted to the single wavelength optical switch 201. In accordance with the set switching state, the single wavelength optical switch 201 outputs the input light signal in any one of the following forms:

(1) the light signal inputted from the optical transmission line 100 is outputted to the optical transmission lines 104 and 101;

(2) the light signal inputted from the optical transmission line 100 is simultaneously outputted to the optical transmission lines 104 and 101; or (3) the signal inputted from the optical transmission line 100 is cut off in the optical switch 201, and the light signal of wavelength 1550 nm inputted from the optical transmission line 106 is outputted to the optical transmission line 101.

Similarly, the wavelengths 1552 nm, 1554 nm and 1556 nm are outputted from the single wavelength optical switches 202–204 to optical transmission lines 112, 116 and 120, respectively. The light signals outputted from the single wavelength optical switches are wavelength-division multiplexed by the optical wavelength multiplexer 302 and then outputted to an optical transmission line 151. The above constitution can realize an optical ADM for the wavelength-division multiplexing. The use of this method has advantages described below. Since the signal light outputted from the optical switch can provide a high optical power, there is typically no need for implementing a booster optical amplifier following the optical wavelength multiplexer. Since the output power can be controlled for each wavelength, it is easy to equalize the optical levels of the wavelength-division multiplexed lights or to control the optical levels. For example, the signal light alone of one wavelength can be intentionally outputted at a high optical level.

The number of wavelengths is not limited to 4 described in the above embodiments. The optional number of wavelengths such as 8, 16, 32 and 64 can be freely set.

Next, a ninth embodiment of the present invention will be described in detail with reference to the drawing.

Figure 13:
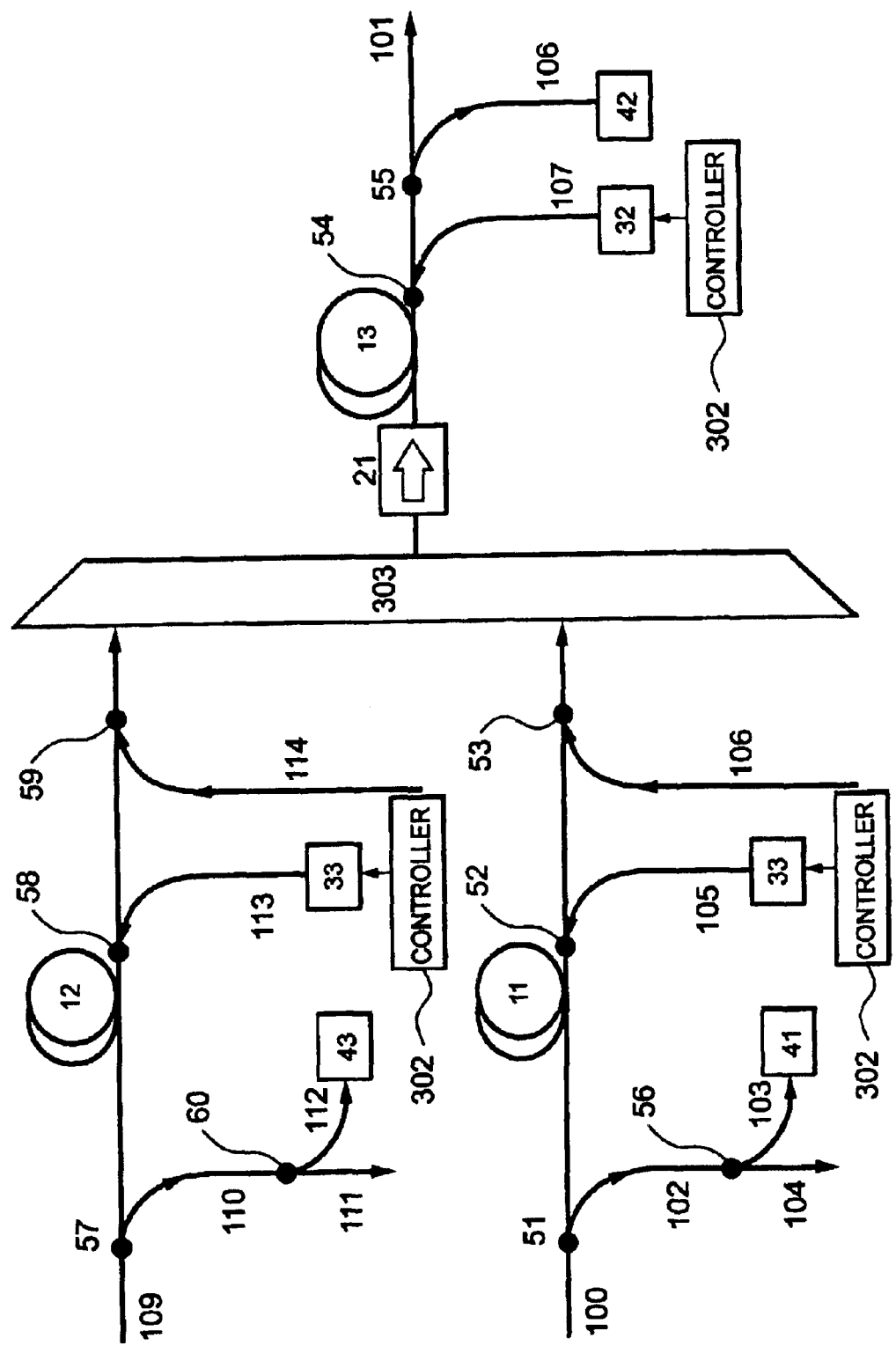
FIG. 13 shows an example of the constitution of an optical switch according to a ninth embodiment of the present invention.

In the eighth embodiment, the optical switch for the wavelength-division multiplexing comprises the optical switches of any one of the first to sixth embodiments which are arranged in parallel as the single wavelength optical switches. Each of the single wavelength optical switches comprises the preceding optical amplifier for determining whether the light signal is transmitted or cut off and the following optical amplifier for controlling the gain. In an application of the optical switch for the wavelength-division multiplexing, the following optical amplifier can be shared with a plurality of single wavelength optical switches. The optical switch thus constituted is shown in FIG. 13 as the ninth embodiment.

The signal light of wavelength 1550 nm is inputted to the EDF 11 through the optical transmission line 100. On the other hand, the pumping light of wavelength 1480 nm, which is outputted from the pumping source 33 to the optical transmission line 105, is inputted to the EDF 11 through the optical branch 52. The signal light is amplified by the EDF 11 and then inputted to an optical wavelength multiplexer 303.

When the input of the pumping light to the EDF 11 is stopped, the signal light of wavelength 1550 nm is absorbed by the EDF 11. By this operation, the optical switch is controlled so that it is turned on or off. An on/off ratio of the optical switch is 60 dB or more, and thus the optical switch of the low crosstalk can be implemented. When the switch is turned off, the signal light is almost completely cut off in the EDF 11, and thus a different light or light signal can be inputted from the optical transmission line 106. The signal light from the EDF 11 or the optical transmission line 106 is inputted to the optical wavelength multiplexer 303. On the other hand, the signal light of wavelength 1552 nm inputted from the optical transmission line 109 or 114 is also inputted to the optical wavelength multiplexer 303 in the same constitution. Two signal lights wavelength-division multiplexed are inputted to the EDF 13 through the optical isolator 21. The wavelength-division multiplexed lights, which are simultaneously amplified by the EDF 13, are outputted to the optical transmission line 101. A part of the output light is separated by the optical branch 55, and the optical power is monitored by the optical monitor 42 and used to control the output power of the pumping source 32. Moreover, the optical branch 51 is disposed on the optical transmission line 100, whereby the light inputted to the optical transmission line 100 can be outputted from the optical transmission line 104 through the optical transmission line 102. That is, the light inputted to the optical transmission line 100 can be simultaneously outputted from the optical transmission lines 101 and 104. It should be noted that the following optical amplifier is shared with the optical switches and thus a control circuit 302 is provided for each pumping source in this embodiment. Thus, the control circuit 302 supplies the control signal for the on/off operation to the one corresponding pumping source alone.

In the above constitution, the following gain control optical amplifier required for each wavelength is shared with the single wavelength optical switches. This permits reducing the total number of optical amplifiers.

The number of wavelengths is not limited to 2 described in the above embodiment. The optional number of wavelengths such as 4 and 8 can be set as far as the lights can be simultaneously amplified.

Next, a tenth embodiment of the present invention will be described in detail with reference to the drawing.

Figure 14:
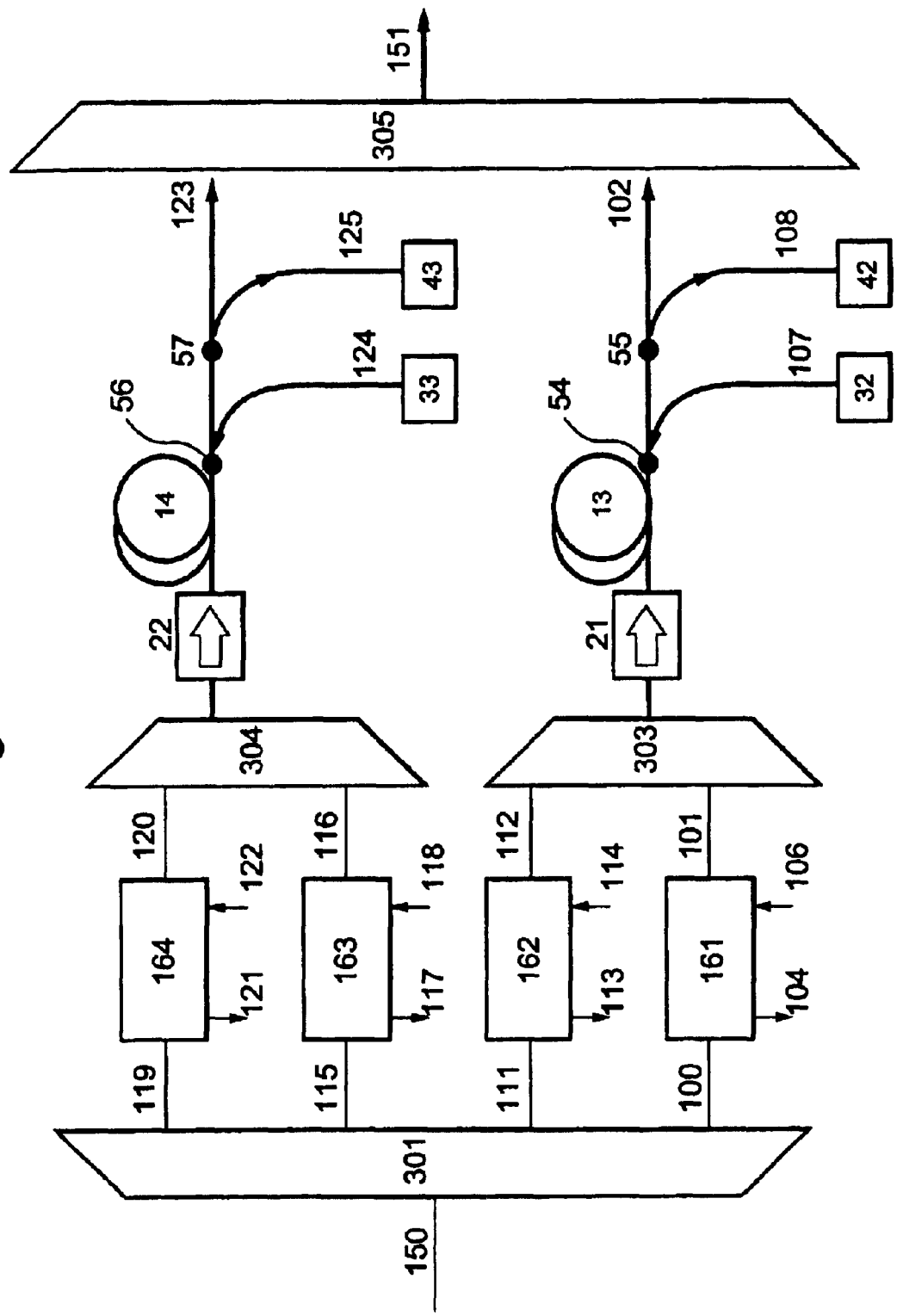
FIG. 14 shows the constitution of an optical ADM according to a tenth embodiment of the present invention.

Typically, an amplification bandwidth of the optical amplifier is finite. Thus, it is difficult for the ninth embodiment to increase the number of treatable wavelengths, as far as a single EDF 13 alone is used. However, this problem can be solved by using a plurality of optical amplifiers having different amplification bandwidths. In this embodiment, the constitution for this purpose is shown. In FIG. 14, there is shown the constitution of the optical switch according to the tenth embodiment. The optical switch shown in FIG. 14 comprises the optical wavelength demultiplexer 301, gate optical amplifiers 161–164, the optical wavelength multiplexers 303 and 304, the optical isolators 21 and 22, the EDFs 13 and 14, the pumping sources 32 and 33, the optical branches 55 and 57, the optical monitors 42 and 43 and an optical wavelength multiplexer 305. Of these components, the gate optical amplifier comprises the preceding optical amplifier of two optical amplifiers constituting the optical switch of any one of the first to seventh embodiments; and the optical branches located at the input and output of the preceding optical amplifier.

The light signal inputted from the optical transmission line 150 is a wavelength-division multiplexed signal light including optical signals whose wavelengths are 1550 nm, 1552 nm, 1554 nm and 1556 nm. The light signals wavelength-division multiplexed are demultiplexed by the optical wavelength demultiplexer 301 and then outputted to the optical transmission lines 100, 111, 115 and 119. The light of wavelength 1550 nm is outputted to the optical transmission line 100. The signal light outputted to the optical transmission line 100 is inputted to the gate optical amplifier 161. In accordance with the set switching state, the gate optical amplifier 161 outputs the input light signal in any one of the following forms:

(1) the signal inputted from the optical transmission line 100 is outputted to the optical transmission lines 104 and 101;

(2) the signal inputted from the optical transmission line 100 is simultaneously outputted to the optical transmission lines 104 and 101; or (3) the signal inputted from the optical transmission line 100 is cut off in the optical switch 201, and the light signal inputted from the optical transmission line 106 is outputted to the optical transmission line 101.

Similarly, the signal lights of wavelengths 1552 nm, 1554 nm and 1556 nm are outputted from the gate optical amplifiers 162–164 to the optical transmission lines 112, 116 and 120, respectively. The lights outputted to the optical transmission lines 101 and 112 are wavelength-division multiplexed by the optical wavelength multiplexer 303 and then outputted to the optical isolator 21. The wavelength-division multiplexed lights are simultaneously amplified by the EDF 13 and then outputted to the optical transmission line 102. On the other hand, the lights outputted to the optical transmission lines 116 and 120 are wavelength-division multiplexed by the optical wavelength multiplexer 304 and then outputted to the optical isolator 22. The wavelength-division multiplexed lights are simultaneously amplified by the EDF 14 and then outputted to an optical transmission line 123. The signal lights outputted to the optical transmission lines 102 and 123 are multiplexed by the optical wavelength multiplexer 305 and then outputted to the optical transmission line 151.

In this embodiment, a plurality of following optical amplifiers to be shared are prepared. Thus, the different amplification bandwidths facilitate the increase of the number of wavelengths that can be treated by the whole optical switch.

The constitution of this embodiment can implement the optical ADM for the wavelength-division multiplexed light signal. Furthermore, this constitution can reduce the number of optical amplifiers required for the optical ADM and can also increase the number of wavelengths.

Next, an eleventh embodiment of the present invention will be described in detail with reference to the drawing.

Figure 15:
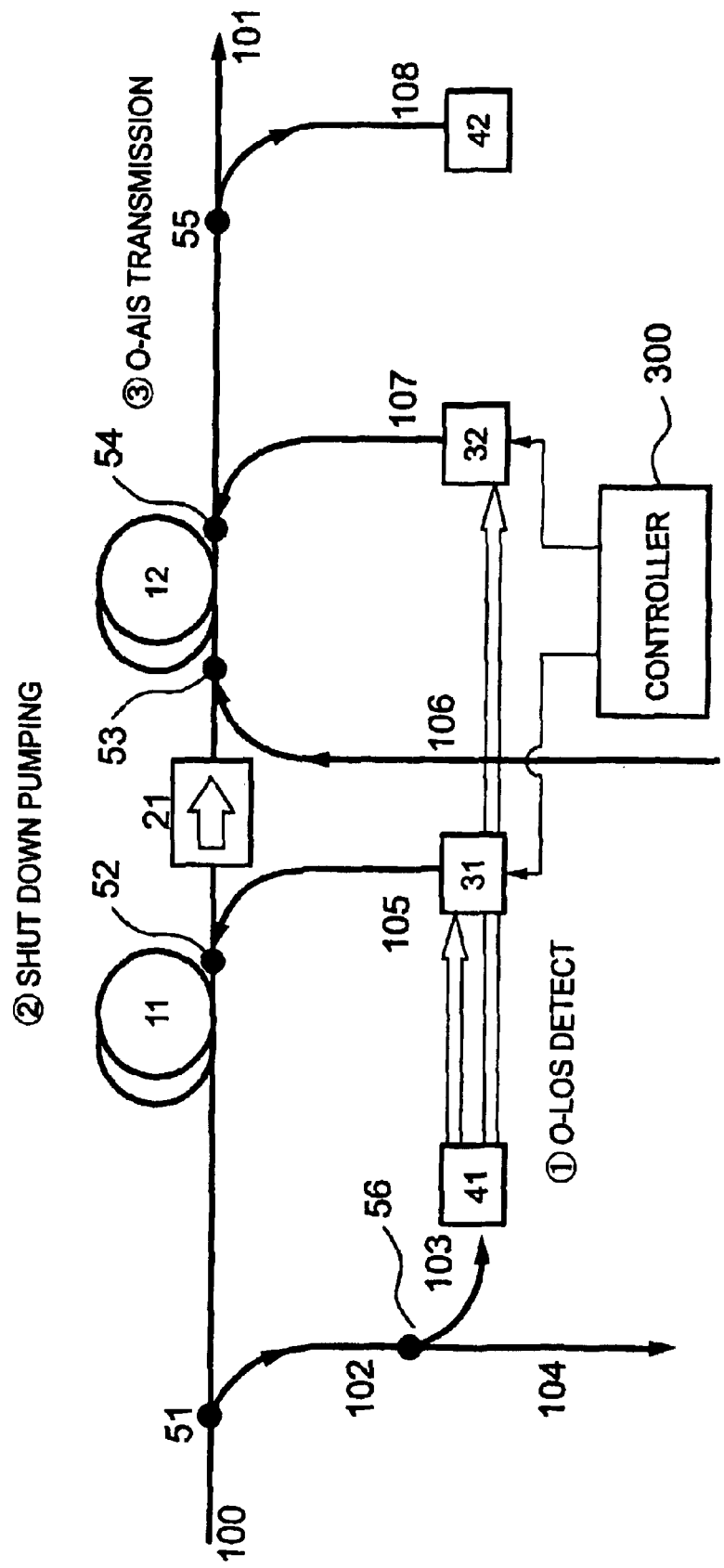
FIG. 15 shows the constitution of an optical switch according to an eleventh embodiment of the present invention.

FIG. 15 shows the constitution of the optical switch according to the eleventh embodiment. How OLOS (optical loss of signal) of the optical ADM is monitored and how AIS-O (also written as O-AIS: AIS denotes Alarm Indication Signal) is signaled to inform that trouble occurs will be described with reference to FIG. 15.

The signal light of wavelength 1554 nm is inputted to the optical transmission line 100. A part of the signal light is inputted to an optical monitor 41 through the optical branches 51 and 56 so that it is used for monitoring. The optical monitor 41 monitors whether the signal light is present or absent. That is, two types of intensities are measured: one intensity is the intensity of the light within a wavelength range including the wavelength of the signal light; and the other is the intensity of a spontaneous emission which has a width equivalent to this wavelength range and is within a different wavelength range from this wavelength range. Whether the signal light is present or absent is determined in accordance with an S/N ratio of the light calculated from the ratio between these intensities. Besides this method, the method of detecting whether the signal light is present or absent also includes the method in which whether the signal light is present or absent is determined from the intensity of the light within the wavelength range of a certain width including the signal light (i.e., OLOS, the optical loss of signal is detected). Any one of these methods permits detecting the trouble in communication caused due to the breaking of an optical fiber or the like. Therefore, the monitoring can be implemented in an optical layer. Immediately after OLOS is detected, the output of the lights from the pumping sources 31 and 32 is shut down. The EDFA gate is turned off (the output from the gate is shut down), whereby no light signal is outputted downward from the optical transmission line 101. OLOS is detected in the same manner, because no light is inputted to the optical monitor 41 of the optical switch which is located more downward than the place where the trouble occurs. The method, in which the information about the occurrence of the trouble is transferred downward by shutting down the output of the light, is called AIS-O. AIS-O permits informing the downward elements that the trouble occurs.

As described above, the optical switch of this embodiment detects OLOS in the optical switch and shuts down the output from the internal pumping source. Thus, the gate switch is turned off, thereby permitting informing that the trouble occurs (AIS-O) in the optical layer without having the influence on the signal lights of other wavelengths.

Figure 16:
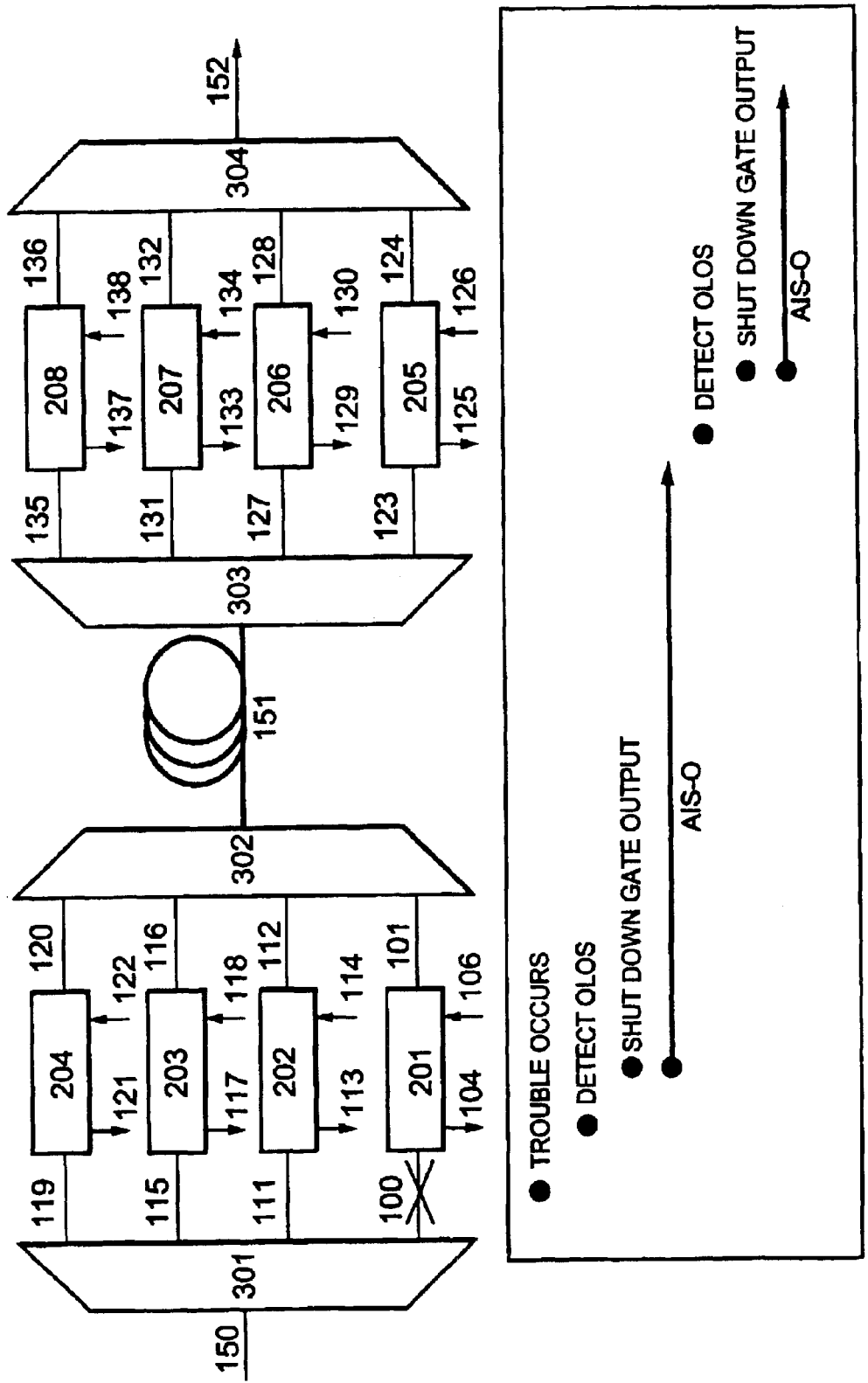
FIG. 16 shows a construction of an optical network according to a twelfth embodiment of the present invention.

Next, a twelfth embodiment of the present invention will be described in detail with reference to the drawing. FIG. 16 shows the constitution of the twelfth embodiment.

The light signal inputted from the optical transmission line 150 is a wavelength-division multiplexed signal light including four signal lights whose wavelengths are 1550 nm, 1552 nm, 1554 nm and 1556 nm. The wavelength-division multiplexed signal light is demultiplexed by the optical wavelength demultiplexer 301 and then outputted to the different optical transmission lines 100, 111, 115 and 119. For example, an arrayed waveguide grating may be used as the optical wavelength demultiplexer 301.

It is assumed that the optical transmission line 100, which the signal light of wavelength 1550 nm is outputted to, is broken. No light is detected by the optical monitor in the single wavelength optical switch 201 which is located more downward than the place where the trouble occurs, namely, OLOS is detected. As soon as OLOS is detected, the EDFA gate in the optical switch 201 is switched off. Thus, AIS-O is sent out downward so as to thereby inform that the trouble occurs. OLOS is also detected by the optical monitor in a single wavelength optical switch 205 of the next node located on the downward side. Similarly, the EDFA gate in the optical switch 205 is switched off, so that AIS-O is sent out downward. On the other hand, no influence is exerted on the transmission lines of other wavelengths having no trouble, and thus the optical transmission can be performed in the same manner as before the trouble occurs. As described above, OLOS is detected and the gate switch in the next downward optical switch is turned off, thereby permitting informing that the trouble occurs in the optical layer without having the influence on the signal lights of other wavelengths.

In the present invention, the number of wavelengths for the optical transmission lines is not limited to 4 described in the above embodiments. The optional number of wavelengths such as 8, 16, 32 and 64 can be freely set, and the wavelength-division multiplexed lights can be collectively switched. Moreover, the wavelength band of the input light is not limited to 1550 nm. The wavelength band can be freely set to 1300 nm or the like. Moreover, a signal rate is not limited to a particular value and can be optionally set to 2.5 Gbps, 5 Gbps, 10 Gbps or the like.

The on/off operation for the optical switch has been mainly described in the above embodiment. However, as described in the first embodiment, the optical power of the pumping light is monitored and feedback-controlled, whereby the intensity of the light outputted from the optical switch can be controlled so that it has an optional value. In the above embodiments, EDF is used as an impurity-doped fiber. However, the impurity-doped fiber doped with any element other than erbium, such as tellurium, for the optical amplifier maybe used. The length of the optical fiber for use in the optical amplifier and an amount of dopant can be freely set in accordance with the specification of the optical switch.

In the above embodiments, the wavelength of the pumping source is set to 1480 nm, 980 nm or the like. However, the wavelength of the pumping source can be appropriately and freely set in accordance with the wavelength of the signal light and the type of the impurity-doped fiber.

The power of the pumping light to be incident on the impurity-doped fiber may be controlled by optional methods, for example, by controlling a current to be injected into the pumping source or by using a variable or fixed attenuator.

The forward pumping, the backward pumping and the bidirectional pumping can be used as the method of pumping the optical fiber amplifier. Furthermore, the pumping lights outputted from a plurality of pumping sources are polarization multiplexed or wavelength-division multiplexed, whereby the high gain can be obtained. A branching ratio of the optical branch constituting the optical switch can be freely set to 1:1, 1:10 or the like in accordance with an optical level design in the optical switch.

The optical filter and the optical isolator can be appropriately disposed in the optical switch in order to prevent the pumping light and the external feedback light from having the influence on the input and output sides of the optical switch. A transmission bandwidth of the optical filter of the fourth embodiment is not particularly specified. This transmission bandwidth can be appropriately set in accordance with the number of signal lights that pass through the optical switch.

Figure 17:
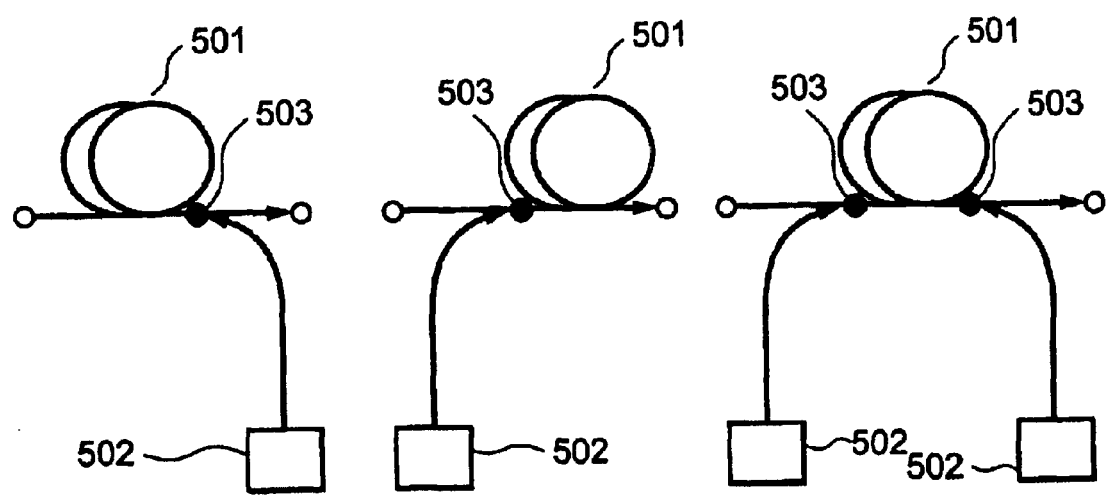
FIG. 17 shows the constitution of an optical fiber amplifier constituting the optical switch of the present invention.
Figure 18:
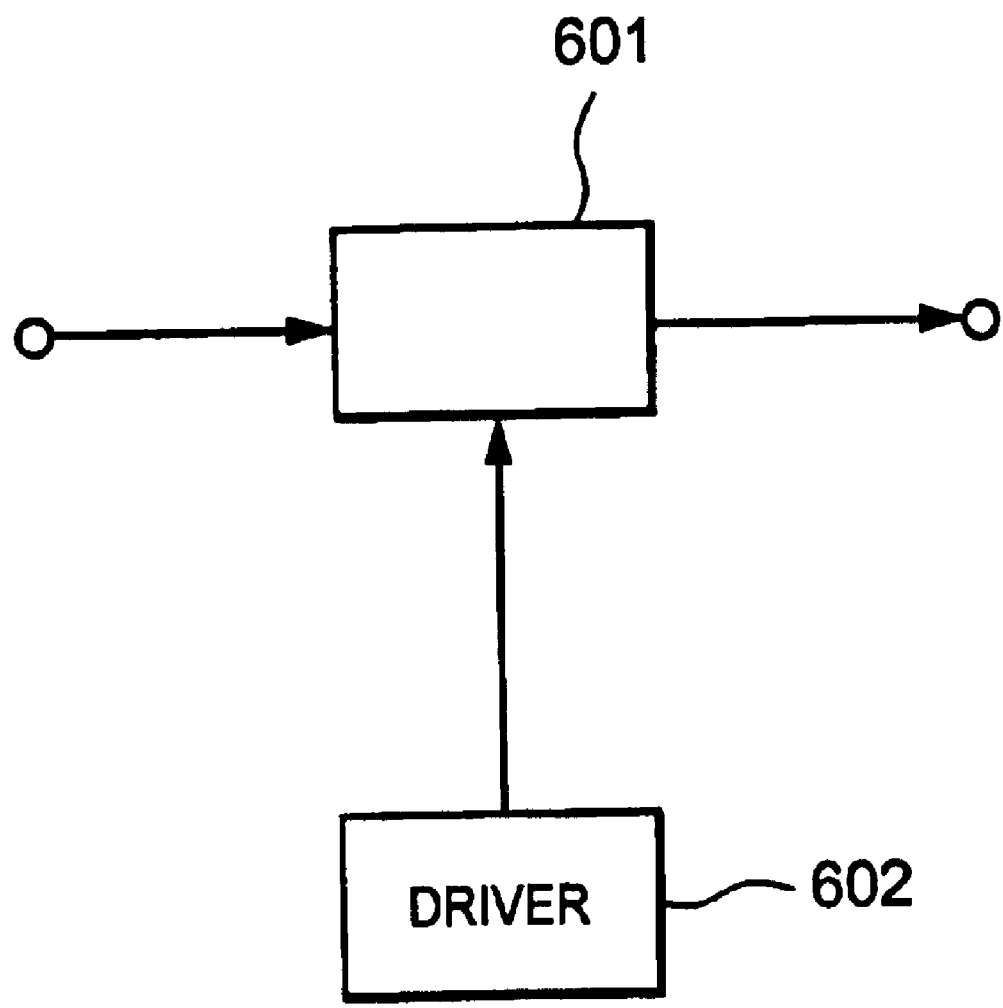
FIG. 18 shows the constitution of a semiconductor optical amplifier constituting the optical switch of the present invention.

In the above embodiments, the optical fiber amplifier is used as the optical amplifier constituting the optical switch. However, a semiconductor optical amplifier can be used as the optical amplifier. In the above embodiments, the optical fiber amplifiers, in which various pumping approaches are used as shown in FIG. 17, are used depending on the purposes. In FIG. 17, the optical fiber amplifier comprises EDF 501, a pumping source 502 and an optical branch 503. To use the semiconductor optical amplifier, these optical fiber amplifiers are replaced by the constitution shown in FIG. 18. The optical amplifier as the optical gate can be switched on or off by switching on or off a driver 602 for supplying the current to be injected into a semiconductor optical amplifier 601.

In the eleventh embodiment, the place having the trouble is described as one place alone in the node of the wavelength optical ADM. However, an optional layer monitor according to the present invention can deal with the following troubles: the trouble that occurs at not only one place but also several places in all the optical transmission lines in the node, an optical transmitter or the like; and the trouble in the optical transmission line between the wavelength optical ADM nodes. Moreover, the position of the optical monitor is not limited to the position described in the above embodiments. The optical monitor can be freely installed by appropriately using the optical branches, and thus it can do the monitoring at the optional position.

In the construction of a ring network, the optical monitor can also be freely installed. The optical layer monitor can be introduced into not only the optical ADM node but also an optical regenerative repeater. Thus, when the trouble occurs, i.e., when the signal is cut off, AIS-O is issued so that self-healing takes place in the optical layer.

In the above embodiments, the optical ADM is exemplified and described as a system in which this optical switch is used. However, this optical switch can be applied to the system such as an optical cross connect system.

According to the optical switch of the present invention, the following effects can be obtained. That is, it is possible to implement the optical switch whose input/output form can be freely set in accordance with a system requirement such as the low crosstalk and the high output power.

The use of the optical switch of the present invention allows the implementation of the optical ADM for the wavelength-division multiplexing in which the signal light of an optional wavelength can be branched and inserted and the optical levels can be equalized and amplified for each wavelength.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical switch comprising:
   a first optical amplifier which includes:
      a first impurity-doped fiber,
      a first optical pumping source connected to said first impurity-doped fiber with a first optical branch,
   a second optical amplifier connected in cascade to said first optical amplifier, which includes:
      a second impurity-doped fiber,
      a second optical pumping source connected to said second impurity-doped fiber with a second optical branch,
   a first optical coupler inserted between said first optical amplifier and said second optical amplifier
   an optical transmission line connected to an input-side of said second optical amplifier, and
   a first control circuit connected to said first optical pumping source and said second optical pumping source,
   wherein said first control circuit instructs said first optical pumping source whether a pumping light is supplied to said first impurity-doped fiber or is stopped, and inserts a signal from said optical transmission line to said second optical amplifier when said pumping light is stopped.

2. The optical switch according to claim 1, wherein said first and second optical amplifiers each comprise a semiconductor optical fiber amplifier.

3. The optical switch according to claim 1, wherein said first and second optical amplifiers each comprise an optical fiber amplifier.

4. The optical switch according to claim 1, further comprising:
   a first optical isolator inserted between said first optical amplifier and said second optical amplifier.

5. The optical switch according to claim 1, further comprising:
   an optical power monitor detecting an optical power outputted from said second optical amplifier.

6. The optical switch according to claim 1, further comprising:
   a third optical amplifier connected to said second optical amplifier with said optical coupler, wherein said third optical amplifier includes:
      a third impurity-doped fiber, and
      a third optical pumping source connected to said third impurity-doped fiber with a third optical branch.

7. The optical switch according to claim 6, wherein said third optical amplifier comprises a semiconductor optical fiber amplifier.

8. The optical switch according to claim 6, further comprising:
an optical power monitor detecting the optical power outputted from said second optical amplifier.

9. The optical switch according to claim 4, further comprising:
a second optical isolator connected to the input of said first optical amplifier; and
a third optical isolator connected to the output of said second optical amplifier.

10. The optical switch according to claim 1, further comprising:
a first optical filter inserted between said first and second optical amplifiers, for passing a signal light wavelength alone therethrough.

11. The optical switch according to claim 10, further comprising:
a second optical filter connected to the output of said second optical amplifier, for passing the signal light wavelength alone therethrough.

12. The optical switch according to claim 1, wherein said first optical pumping source generate a pumping light whose wavelength is in a 980 nm wavelength region to be inputted to said first erbium-doped fiber.

13. The optical switch according to claim 1, wherein at least one of said first and second optical amplifiers comprises a forward-pumped optical fiber amplifier.

14. The optical switch according to claim 1, wherein at least one of said first and second optical amplifiers comprises a bidirectional-pumped optical fiber amplifier.

15. The optical switch according to claim 1, wherein at least one of said first and second optical amplifiers comprises an optical fiber amplifier having the pumping light generated by wavelength-division multiplexing.

16. The optical switch according to claim 1, wherein at least one of said first and second optical amplifiers comprises an optical fiber amplifier having the pumping light generated by polarization multiplexing.

17. An optical switch for wavelength-division multiplexed light which is obtained by wavelength-division multiplexing a plurality of light signals, said optical switch comprising:
an optical wavelength demultiplexer for demultiplexing said wavelength-division multiplexed light into said plurality of light signals and outputting each of said plurality of light signals to each of a plurality of branches;
a plurality of single wavelength optical switches, each being connected to each of said plurality of branches; and
an optical wavelength multiplexer for multiplexing the lights outputted from said plurality of single wavelength optical switches,
wherein each of said plurality of single wavelength optical switches comprises:
a first optical amplifier;
a second optical amplifier connected in cascade to said first optical amplifier;
a control circuit for outputting first and second control signals for switching a gain of said first and second optical amplifiers;
a first optical coupler inserted between said first and second optical amplifiers,
wherein each of said plurality of single wavelengths optical switches comprises:
a first optical amplifier which includes:
a first impurity-doped fiber; and
a first optical pumping source connected to said first impurity-doped fiber with a first optical branch;
a second optical amplifier connected in cascade to said first optical amplifier, and which includes:
a second impurity-doped fiber; and
a second optical pumping source connected to said second impurity-doped fiber with a second optical branch;
a first optical coupler connected to said first optical amplifier;
a second optical coupler inserted between said first and second optical amplifiers; and
a first control circuit for outputting first and second signals for switching a gain of said first and second optical amplifiers.

18. An optical switch for a wavelength-division multiplexed light which is obtained by wavelength-division multiplexing a plurality of light signals, said optical switch comprising:
an optical wavelength demultiplexer for demultiplexing said wavelength-division multiplexed light into said plurality of light signals and outputting each of said plurality of light signals to each of a plurality of branches;
a plurality of first optical couplers, each being connected to each of said plurality of branches;
a plurality of first optical amplifiers, each having an input connected to an output of each of said plurality of first optical couplers;
a plurality of second optical amplifiers connected in cascade to said first optical amplifiers to receive an input from said plurality of first optical amplifiers;
a plurality of second optical couplers, inserted between said first and second optical amplifiers;
at least one first optical wavelength multiplexer whose input is connected to each of output-side branches of some of said plurality of second optical couplers;
at least one third optical amplifier whose input is connected to the output of said at least one first optical wavelength multiplexer; and
a control circuit for outputting first and second control signals for switching a gain of said first and second optical amplifiers.

19. The optical switch according to claim 18, further comprising:
a second optical wavelength multiplexer whose input is connected to the output of said at least one second optical amplifier.

20. The optical switch according to claim 1, further comprising:
a signal light detector for detecting whether or not a signal light is inputted to said first optical amplifier and then outputting the result of detection as a detect signal,
said first control circuit for providing said first and second optical amplifiers with control signals for shutting down said first and second optical amplifiers, when said detect signal is inputted to said first control circuit to indicate that said signal light is not inputted to said first optical amplifier.

21. An optical network in which a plurality of optical nodes are connected through optical fiber transmission lines,
wherein each of said plurality of optical nodes comprises an optical switch as defined in claim 20.

22. The optical switch according to claim 1, wherein said first optical amplifier switches a route of light.

23. The optical switch according to claim 18, wherein said first optical amplifier switches a route of said light signals.

24. The optical switch of claim 1, wherein said second coupler is for receiving input light to increase a power of said input signal.

25. An optical signal switching method comprising:

inputting a first optical signal to a first impurity-doped fiber;

inputting a second optical signal to said first impurity-doped fiber from a first optical pumping source;

inputting a second optical signal to a second impurity-doped fiber, from a second pumping source;

outputting said optical signal from second impurity-doped fiber; and controlling a control circuit connected to said first optical pumping source and said second optical pumping source, wherein said control circuit instructs said first optical pumping source whether a pumping light is supplied to said first impurity-doped fiber or is stopped, and inserts a signal from a optical transmission line connected to an input-side of said second optical amplifier to said second optical amplifier when said pumping light is stopped.

26. The method of claim 25, further comprising:

amplifying said optical signal by said first impurity-doped fiber.

27. The method of claim 25, further comprising:

amplifying said optical signal by said second impurity-doped fiber.

28. The optical switch according to claim 1, further comprising:

a second optical coupler connected to said first optical amplifier.

29. The optical switch according to claim 1, wherein said first impurity-doped fiber and said second impurity-doped fiber comprises erbium or tellurium as a doped element.

30. The optical switch according to claim 6, wherein said third impurity-doped fiber comprises erbium or tellurium as a doped element.

31. The optical switch according to claim 6, wherein said third optical amplifier comprises an optical fiber amplifier.

32. The optical switch according to claim 18, further comprising:

an optical transmission line connected to an input-side of said second optical amplifier.

33. The optical switch according to claim 18, wherein each of said plurality of first optical amplifiers includes a first impurity-doped fiber and a first optical pumping source connected to said first impurity-doped fiber with a first optical branch, wherein each of said plurality of second optical amplifiers includes a second impurity-doped fiber and a second optical pumping source connected to said second impurity-doped fiber with a second optical branch.

34. The optical switch according to claim 33, wherein said control circuit instructs said first optical pumping source whether a pumping light is supplied to said first impurity-doped fiber or is stopped, and inserts a signal from said optical transmission line to said second optical amplifier when said pumping light is stopped.

35. The optical switch according to claim 33, wherein said first impurity-doped fiber and said second impurity-doped fiber comprise erbium or tellurium as a doped element.

36. The method of claim 25, wherein said first impurity-doped fiber and said second impurity-doped fiber comprise erbium or tellurium as a doped element.

* * * * *